(12) United States Patent
Eom et al.

(10) Patent No.: US 8,051,074 B2
(45) Date of Patent: Nov. 1, 2011

(54) METHOD OF CONTROLLING DISPLAY OF COMMENTS

(75) Inventors: Mi Suk Eom, Seoul (KR); Hyun Jung Moon, Seoul (KR); Seong-jun Park, Seoul (KR); Yangji Kim, Seoul (KR); Sun Young Park, Seoul (KR); Su ryun Shin, Seongnam-si (KR); Jeongsang Lee, Seoul (KR); Ji Woon Jung, Seongnam-si (KR); Kuk-Jin Kang, Seoul (KR)

(73) Assignee: NHN Corporation, Seongnam-si (KR)

( * ) Notice: Subject to any disclaimer, the term of this patent is extended or adjusted under 35 U.S.C. 154(b) by 408 days.

(21) Appl. No.: 12/186,951

(22) Filed: Aug. 6, 2008

(65) Prior Publication Data

US 2009/0070376 A1 Mar. 12, 2009

(30) Foreign Application Priority Data

Sep. 12, 2007 (KR) .................. 10-2007-0092821

(51) Int. Cl.
*G06F 7/00* (2006.01)
*G06F 17/30* (2006.01)
(52) U.S. Cl. ........................ 707/722; 707/732
(58) Field of Classification Search ................... None
See application file for complete search history.

(56) References Cited

U.S. PATENT DOCUMENTS 7,461,051 B2 * 12/2008 Lavine .................................. 1/1
2006/0149708 A1 * 7/2006 Lavine ............................. 707/3

FOREIGN PATENT DOCUMENTS

JP 2002-157203 5/2002

OTHER PUBLICATIONS www.slashdot.com FAQ webpages from Aug. 28, 2005.*
Follow the reader: filtering comments on slashdot, Lampe, Cliff A C, Johnston, Erik and Resnick, Paul, Conference on Human Factors in Computing Systems: Proceedings of the SIGCHI conference on Human factors in computing systems, Apr. 28-May 3, 2007, 2007.*
Enhancing Reputation Mechanisms via Online Social Networks, Tad Hogg et al., EC'04, May 17-20, 2004.*
Web-Based Reputation Management Systems: Problems and Suggested Solutions, by Malaga et al., Electronic Commerce Research, 1: 403-417 (2001).*
Finding others online: reputation systems for social online spaces, by Jensen et al., CHI 2002, Apr. 20-25, 2002.*
Yusuke Mito, et al., "Ad Hoc Community Formation System with Reliability Information by vote." pp. 135-136.

* cited by examiner

*Primary Examiner* — Jay Morrison
(74) *Attorney, Agent, or Firm* — H.C. Park & Associates, PLC (57) ABSTRACT

Disclosed is a method of selectively displaying comments posted by users. The method comprises setting, by a first user, a threshold value for use in determining whether to display comments posted by users of an Internet service; and sending, by the first user, a request for displaying a page of the Internet service. The requested page contains a comment or a title of a comment posted by a second user who is assigned a reputation index. The method further comprises displaying, on a screen associated with the first user, the requested page, wherein the comment or the title of the second user is selectively redacted based on comparison of the reputation index of the second user with the threshold value of the first user.

20 Claims, 5 Drawing Sheets

Coordinator of HAHA who looks like Kim, Taehee is getting married!

[ by Sports Seoul, June 14, 2007, 15:03 ]

Netizen comments | List

Who? The actress Kim, Taehee?????

commandoman  Read more

Whatever!

One-line
-comments (0)

Read 235 | Agree 7 | Disagree 35    2007/06/14 15:24
IP 121.144.xxx.170  Report

Agree | Disagree | Submit

List | Write comments

Fig. 3

Netizen comments [Hide▲]

| Total 324 | Track Back 15 | Reporter's comments 57 | | | |
|---|---|---|---|---|---|
| | | | Read | Agree▼ | Writing day ▲ |
| | | | | | 07.10 17:57 |
| [Operator] No weird comments please unless you want to get caught. Afraid? | | | | | |
| Report's comments title | | Lee, Dong Jin | 294 | 29 | 07.10 17:57 |
| Report's comments title | | Lee, Dong Jin | 294 | 29 | 07.10 17:57 |
| This is where your comments should be. | | kaiser675 | 5733 | 35 | 07.10 17:57 |
| You'd better watch your language. [3] | | bsjob | 847 | 0 | 07.10 17:58 |
| That singer is going to join the military? No way! | | cblair | 9834 | 0 | 07.10 17:59 |
| Isn't she coming back to the entertainment world? [1] I hope she is. | | valhyon | 567 | 0 | 07.10 18:00 |
| g g g | | jus7312 | 3578 | 32 | 07.10 18:30 |
| Honestly, on that that I ... [7] | | hoony39 | 23 | 13 | 07.10 19:15 |
| Ha Ha Ha, I just love this kind of comment. | | kimjinlae | 173 | 55 | 07.10 20:12 |
| Guess what? I am transformer! [15] | | ideasc | 921 | 37 | 07.10 20:53 |
| I want to know what the limit is on word counts, but how? | | mkkanmdtoast | 0 | 0 | 07.10 20:13 |
| I don't even know what I am thinking. | | nvnv7101 | 37 | 17 | 07.10 21:30 |

Blind setting [?] — 302

304

Next Page

Fig. 4

| Comments collection of Amhappy7 | Go to blog |

The rating score of Amhappy7 is 168.

How to increase the rating score?

Comments on my comment    200    ◄Previous  Next ►

There is one-line-comment on Hello, I am blablabla    06.13 10:03
There is one-line-comment on HaHaHaHa LaLaLa.    06.13 10:03
There is one-line-comment on Hello, I am blablabla    06.13 10:03
There is one-line-comment on HaHaHaHa LaLaLa.    06.13 10:03
There is one-line-comment on HaHaHaHa LaLaLa.    06.13 10:03

Setup option for reading comments

- Comment blind setting;
- Comment reading setting;
- Specify IDs for restricting their comments : veloso x    [Add]
- Specify IDs for highlighting their comments : sugar2222 x    [Add]

| Total 374 Trackback 15 | Read | Agree▼ | Writing day▼ |

This is where your comments should be.                    5733   35   07.10 17:57
You'd better watch your language.              [3]        847    0    07.10 17:58
That singer is going to join the military? No way!        9834   0    07.10 17:59
Isn't she coming back to the entertainment world?[1]      567    0    07.10 18:00
I hope she is.
g g g                                                     3578   32   07.10 18:30
Honestly, on that that I ... [7]                          23     13   07.10 19:15
Ha Ha Ha, I just love this kind of comment.               173    55   07.10 20:12
Guess what? I am transformer! [15]                        921    37   07.10 20:53
I want to know what the limit is on word counts,          0      0    07.10 20:13
but how?
I don't even know what I am thinking.                     37     17   07.10 21:30

◉Title ○Contents [               ]  [search]

| 1 | 2 | 3 | 4 | 5 | 6 | 7 | 8 | 9 | 10 |  Next ►

Fig. 5

| Comments collection of Amhappy7 | | | Go to blog | |
|---|---|---|---|---|

The rating score of Amhappy7 is 168.

How to increase the rating score?

Block the comments from this person any time.

Highlight the comments from this person.

0          100          200

| Total 374  Trackback 15 | Read | Agree▼ | Writing day ▼ |
|---|---|---|---|
| This is where your comments should be. | 5733 | 35 | 07.10 17:57 |
| You'd better watch your language. [3] | 847 | 0 | 07.10 17:58 |
| That singer is going to join the military? No way! | 9834 | 0 | 07.10 17:59 |
| Isn't she coming back to the entertainment world?[1] I hope she is. | 567 | 0 | 07.10 18:00 |
| g g g | 3578 | 32 | 07.10 18:30 |
| Honestly, on that that I ... [7] | 23 | 13 | 07.10 19:15 |
| Ha Ha Ha, I just love this kind of comment. | 173 | 55 | 07.10 20:12 |
| Guess what? I am transformer! [15] | 921 | 37 | 07.10 20:53 |
| I want to know what the limit is on word counts, but how? | 0 | 0 | 07.10 20:13 |
| I don't even know what I am thinking. | 37 | 17 | 07.10 21:30 |

⊙Title ○Contents [______________] [Search]

| 1 | 2 | 3 | 4 | 5 | 6 | 7 | 8 | 9 | 10 | Next ▸

METHOD OF CONTROLLING DISPLAY OF COMMENTS

CROSS-REFERENCE TO RELATED APPLICATION

This application claims priority to and the benefit of Korean Patent Application No. 10-2007-0092821, filed Sep. 12, 2007, the disclosure of which is incorporated herein by reference in its entirety.

BACKGROUND

1. Field

The present disclosure relates to running a website service, and more particularly, to posting comments on other posted information in a website.

2. Discussion of the Related Technology

With the advances in Internet-based technologies related to distributing and sharing all kinds of information, numerous Internet portal sites enthusiastically provide information in text, image or moving picture format with regard to books, online dictionary, local, news, shopping, etc. Also, nowadays in the Internet environment, users get actively involved in making or posting comments on such information. Particularly, as to an Internet news service, users are provided with not only news articles or press releases from all media companies, but also user feedbacks such as comments posted by other users regarding certain news articles or press releases. The term 'comments' used herein can be understood as all and any types of information created by users about information or contents. Here, the information or contents are typically contained in a webpage of the Internet service allowing its users to post comments, although not necessary. Also, the information or contents could be user posted ones. Typically, comments are expressed in text form, but may include images or moving pictures.

The biggest role of such comments is to let people more easily share their evaluations, feelings, opinions and the like with regard to contents such as Internet news articles, and also to provide a user feedback to content providers. In addition, comments sometimes convey evaluation reports on a specific content (mainly, a commercial content such as description on a certain product) from the viewpoint of consumers. In such cases, comments are of economic value as they are.

In reality, however, such comments have adverse effects as well as good effects. As an example, there has been an increase in the number of people who take advantage of anonymity on the Internet and habitually post irresponsible or groundless vituperation or snide remarks (so-called 'malicious comments'). Moreover, such malicious comments drive some people to take legal proceedings against those people for libel. Thus, several attempts have been made to minimize the adverse effects of comments.

One of them is a log-in requirement system, which is now broadly known. The log-in requirement system asks a user to fill out a brief personal data form including a name, a social security number, etc., and allows only users having a log-in ID and a password given from an Internet portal site of interest to leave comments. This system has somewhat reduced malicious comments, compared to the case where people did not have to log in to leave comments. However, there has not been much success in reducing malicious comments because people could still leave comments without submitting their real name.

There are other approaches to resolve adverse effects of comments. One of them was to designate swear words or abusive languages as key words to be censored such that posting any comment including those censored key words to a bulletin board may be automatically banned. And, there was another approach for an Internet portal site operator to delete a malicious comment of concern in response to a report from other users or to restrict the access of a person who posted that comment. Despite the efforts with censored key words, malicious commenters could still continue their misbehaviors in indirect and circuitous ways as long as they want. Also, sanctioning malicious commenters upon receipt of a report from other users is too late an action that can be done only after a particular user has already been hurt mentally or emotionally.

According to the statistical record provided by one of major Internet portal sites in Korea, www.naver.com, at least 4% of all comments on the up-to-date Internet news articles were turned out to be malicious comments, and thus deleted. Considering that there may be much more malicious comments that were not actually reported, one can assume that many users might have suffered from very serious mental/emotional damages due to those malicious comments. Therefore, the above methods for controlling malicious comments are confronted with the limitations as noted above.

In order to resolve the aforementioned problems, 'Restrictive personal identification and authentication system' according to Article 44(5)(Bulletin board users' personal identification) of the Korean law for promoting use of information and communication networks and protecting personal information online has become effective since Jul. 27, 2007. The restrictive personal identification and authentication system requires a user to go through a one-time personal identification procedure, provided that a comment written by a particular individual is open to others. The main purpose of the restrictive personal identification and authentication system is to strongly encourage people to become more conscious and responsible for their writing malicious comments in the Internet space, but it could not be the ultimate solution for prohibiting people from posting malicious comments. In reality, even some web sites that employ the real-name registration system for Internet access are not free from malicious comments. Results of a recent survey asking people 'Do you think the restrictive personal identification and authentication system is effective to root out malicious comments?,' indicate that 3,217 (64%) out of a total of 5,027 Internet users answered that it would not be that much effective, and only 1,568 Internet users (31.2%) answered that it would be very effective (This survey was conducted by another Internet portal site in Korea, Dcinside (www.dcinside.com), from Jul. 27, 2007 through Aug. 5, 2007). This suggests that the restrictive personal identification and authentication system shows limits to control malicious comments.

The foregoing discussion in the background section is to provide general background information, and does not constitute an admission of prior art.

SUMMARY

One aspect of the invention provides a method of selectively displaying comments posted by users. The method comprises: setting, by a first user, a threshold value for use in determining whether to display comments posted by users of an Internet service; sending, by the first user, a request for displaying a page of the Internet service, wherein the requested page contains a comment or a title of a comment posted by a second user who is assigned a reputation index; and displaying, on a screen associated with the first user, the requested page, wherein the comment or the title of the second user is selectively redacted based on comparison of the reputation index of the second user with the threshold value of the first user.

In the foregoing method, the comment or the title of the second user may be censored when the threshold value is greater than the reputation index, whereas the comment or the title of the second user is displayed when the threshold value is smaller than the reputation index. The comment or the title of the second user may be censored when the threshold value is smaller than the reputation index, whereas the comment or the title of the second user is displayed when the threshold value is greater than the reputation index. The method may further comprise: sending, by the first user, a request to unredact a redacted portion of the page; and displaying the page containing the initially redacted portion as unredacted. The comment may be an opinion or information made by the second user regarding at least one selected from the group consisting of a news article, a commentary, a review, and information on a product or service.

Another aspect of the invention provides a method of selectively displaying comments posted by users. The method comprises: receiving, from a first user, a request for displaying a page; determining that the requested page contains a comment posted by a second user or a title of the comment; determining that the second user has been assigned a reputation index, which is indicative of reputation of comments posted by the second user; and determining whether to display the comment or the title on the page using the reputation index.

In the foregoing method, the method may further comprise: receiving, from the first user, a request for setting a threshold value for use in determining whether to display comments or titles of comments posted by other users of the Internet service; and setting the threshold value for the first user in reply to the request therefor. Determining whether to display the comment or the tile may comprise comparing the threshold value with the reputation index.

The foregoing method may further comprise: sending data configured to display the requested page to a terminal associated with the first user, and wherein when it is determined not to display the comment or the title, the comment or the title is redacted on the requested page. The comment or the title of the second user is censored when the threshold value is greater than the reputation index, whereas the comment or the title of the second user is displayed when the threshold value is smaller than the reputation index. The comment or the title of the second user may be censored when the threshold value is smaller than the reputation index, whereas the comment or the title of the second user is displayed when the threshold value is greater than the reputation index. The comment may be an opinion or information made by the second user regarding at least one selected from the group consisting of a news article, a commentary, a review, and information on a product or service.

Still another aspect of the invention provides a method of operating an Internet service allowing its users to post comments. The method comprises: posting a plurality of comments made by a first user of an Internet service; receiving a plurality of inputs of users on at least part of the plurality of comments of the first user; and processing the plurality of inputs so as to assign a reputation index, which is configured to be used in determining whether to include a comment of the first user or a title of the comment on a page of the Internet service.

In the foregoing method, the comment may be an opinion or information made by the second user regarding at least one selected from the group consisting of a news article, a commentary, a review, and information on a product or service. The plurality of inputs may comprise at least one selected from the group consisting of a score, a rating, and a selection among two or more levels of approval or agreement with the comment. The reputation index may be generated using other information relating to comments of the first user in addition to the plurality of inputs of users of the Internet service. The method may further comprise: receiving additional inputs of users on at least part of the plurality of comments of the first user; and further processing additional inputs so as to modify the reputation index of the first user.

The foregoing method may further comprise: receiving, from a second user, a request for displaying a page; determining that the requested page contains a comment posted by the first user or a title of the comment; and determining whether to display the comment or the title on the page using the reputation index. The method may further comprise: sending data configured to display the requested page to a terminal associated with the first user, and wherein when it is determined not to display the comment or the title, the comment or the title is redacted on the requested page. The method may further comprise: setting a threshold value for use in determining whether to display comments or titles of comments posted by other users of the Internet service; and wherein determining whether to display comprises comparing the threshold value with the reputation index.

One aspect of the present invention provides a novel method for controlling the display of comments, and a system and a computer-readable recording medium for implementing the method. Another aspect of the present invention is to minimize adverse effects that may occur due to malicious comments. Still another aspect of the present invention is to create a positive, healthy environment for posting comments into Internet space based on rating scores or other information set by users.

In accordance with one aspect of the present invention, there is provided a method for controlling the display of comments provided from a server to a user terminal unit, comprising the steps of: acquiring a primary electronic parameter related to a commenter who posted at least one comment and a secondary electronic parameter stored specifically for the user with regard to whether to allow the at least one comment to be displayed; and controlling the display of the at least one comment in consideration of the electronic parameters.

In accordance with another aspect of the present invention, there is provided a method for controlling the display of comments provided from a server to a user terminal unit, comprising the steps of: acquiring an electronic parameter stored specifically for the user with regard to whether to allow at least one comment to be displayed; and controlling the display of the at least one comment in consideration of the electronic parameter.

In accordance with still another aspect of the present invention, there is provided a system for providing a user computation device with a content including at least one comment, in cooperation with a comment database, a database storing user-specific history of comment posting, and a database storing user-set criteria for the display of comments, the system comprising: a comment information extraction part for extracting information on at least one comment from the comment database; a comment display restriction part for restricting the display of at least part of the at least one comment information; and a content transmission part for transmitting, to the user computation device, a content including the at least one comment, wherein the display of the at least one comment is restricted at least in part.

BRIEF DESCRIPTION OF THE DRAWINGS

The above and other aspects and features of the present invention will become apparent from the following description of embodiments, given in conjunction with the accompanying drawings, in which.

DETAILED DESCRIPTION OF EMBODIMENT

In the following detailed description, reference is made to the accompanying drawings that show, by way of illustration, specific embodiments. It is to be understood that the various embodiments of the invention, although different, are not necessarily mutually exclusive. The following detailed description is, therefore, not to be taken in a limiting sense, and the scope of the present invention is defined only by the appended claims that should be appropriately interpreted along with the full range of equivalents to which the claims are entitled.

Hereinafter, various embodiments of the present invention will be described in more detail with reference to the accompanying drawings.

One embodiment provides a method of running a website that allows its users to post comments on other posted information such as news reports and opinion columns on the website. Each user posting comments is assigned an index indicative of reputation of the comments posted by the user. The index is computed based on approval or disapproval of each comment by readers of the comment. Users of the website are allowed to set a threshold of the index that is used for determining whether to display comments posted by other users. For example, in a page comprising a listing of comments, those comments that are posted by users having indices higher (alternatively, lower) than the threshold are censored and not displayed.

Configuration of Entire System and Blind Function

Figure 1:
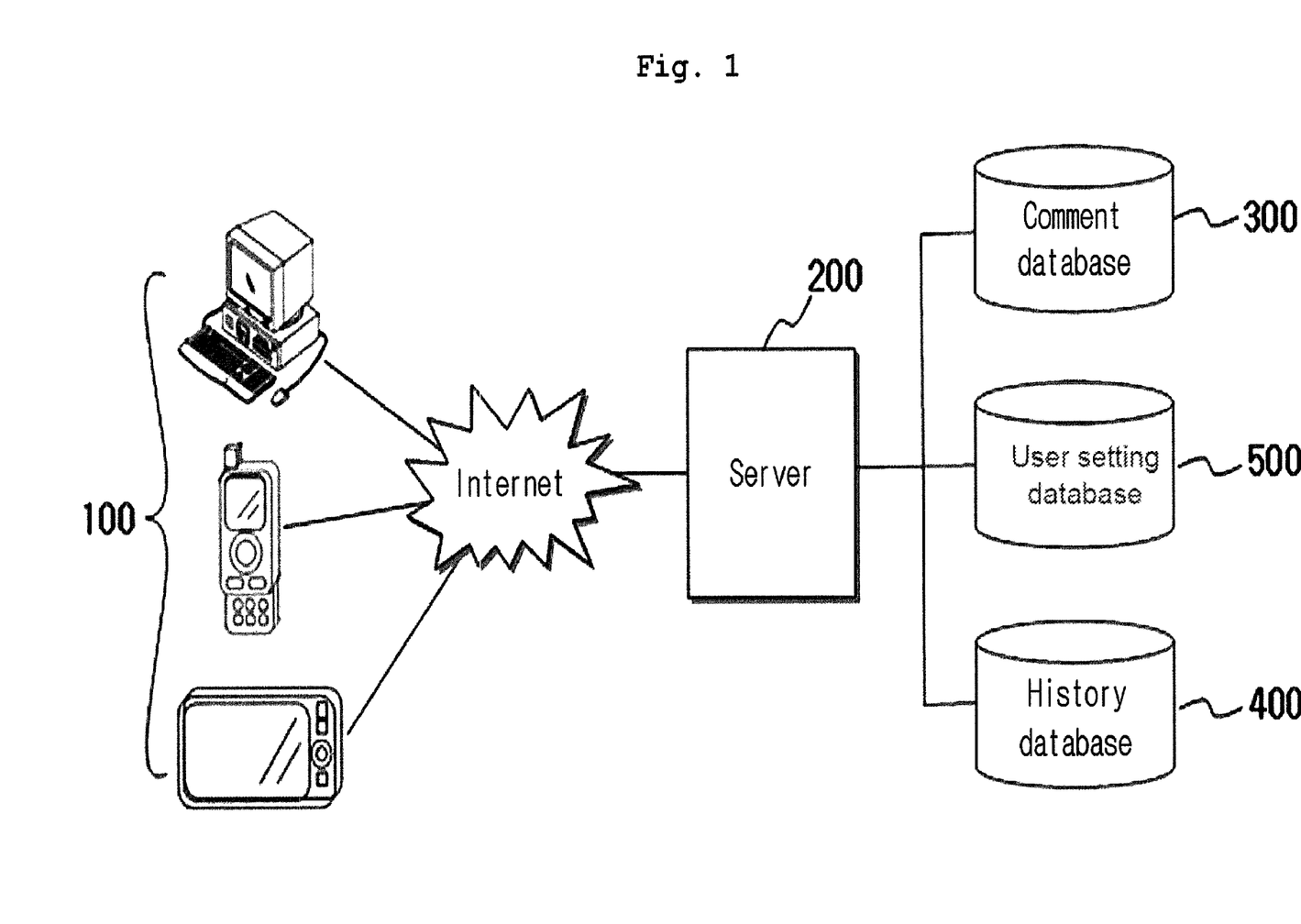
FIG. 1 shows the configuration of an entire system in accordance with the present invention.

FIG. 1 illustrates the configuration of an entire system in accordance with one embodiment of the present invention.

Referring to FIG. 1, a user terminal unit 100 of the entire system in accordance with one embodiment of the present invention includes a variety of digital devices. As an example, a personal computer or a cell phone, both of which are the most broadly used user terminal units, or any type of digital devices such as PDA, PMP or the like, which can access the Internet either via wire or wirelessly, may be employed as a user terminal unit 100 of the entire system for one embodiment of the present invention.

In the entire system of one embodiment of the present invention, a user may write comments through an input operation on the user terminal unit 100. The comments are then transmitted to a server 200 and stored in a comment database 300. If necessary, the server 200 may allow users and/or Internet portal site operators to manage (e.g., retrieving, searching, deleting and the like) particular comments that are stored in the comment database 300. The comment database 300 may contain an Internet contents ID to which a certain comment belongs, a comment ID (if any), a user ID of a person who wrote the comment, a URL (if any), the date and time when the comment was written or revised, and the contents of the comments. The server 200, therefore, manages comments based on information in the comment database 300. Although the server 200 and the comment database 300 are illustrated to be separated in FIG. 1, the server 200 may incorporate the comment database 300 therein, if necessary.

Meanwhile, the server 200 in accordance with one embodiment of the present invention may further perform an additional function of managing user-specific history data that is stored in a history database 400 for each user with regard to his or her writing comments. As an example, suppose that a user received a disciplinary punishment such as a warning from the Internet portal site operator, and was also banned from posting a comment and from making login attempts to that particular Internet portal site, information on this punishment can be stored as history data in the history database 400. Such an action of the operator may be based on reports from other users. In addition, if a rating score (to be described later) of the user has been lowered because of the comment he or she had left, information thereon can be stored as history data in the history database 400. Also, history data in accordance with one embodiment of the present invention may include information related to an increase of the user's rating score. Therefore, rating scores of users to be described below may also be calculated and stored in the history database 400. Although the server 200 and the history database 400 are shown to be separated in FIG. 1, the server 200 may incorporate the history database 400 therein, if necessary.

The server 200 can also refer to a user setting database 500. The user setting database 500 is a device for storing user-specific display permit criteria set by each user with regard to comments. In accordance with one embodiment of the present invention, a user may automatically restrict the display of comments made by a particular user, or always make comments by another particular user highlighted.

Figure 2:
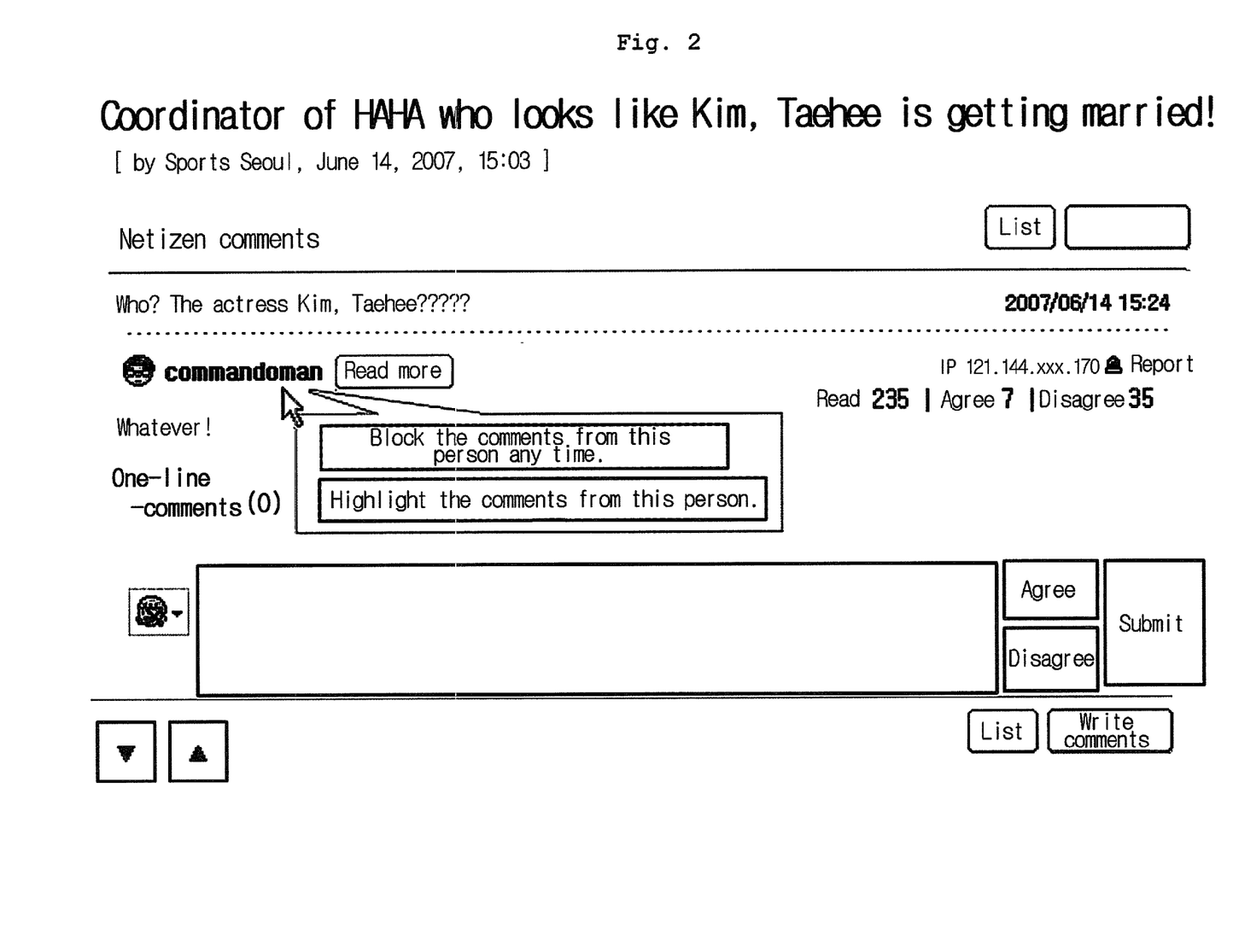
FIG. 2 illustrates a user interface that is capable of either blocking the display of other users' comments or highlighting them, in accordance with one embodiment of the present invention.

FIG. 2 illustrates a user interface in accordance with one embodiment of the present invention, in which the display of comments by other users is either blocked or highlighted at any time. There may be a button a user may use, while accessing an Internet portal site, to block or highlight comments by another user at any time. This can be provided by locating a mouse cursor on an ID component of another user or clicking the user ID component, as shown in FIG. 2.

In addition, in accordance with an embodiment of the present invention, a user may make only part of the comments appear or be displayed according to the rating scores of other users who left those comments (this may be named a 'blind' function). To this end, the user setting database 500 stores a user ID, IDs of other users, whose comments are banned from being displayed to the user, and IDs of still other users, whose comments is highlighted, together with a user-set reference rating score for the selective display of comments. If the reference rating score has not been specified, a reference rating score of a default value may be stored therein. Like other databases, the server 200 may incorporate the user setting database 500 therein, if necessary.

As noted above, the comment database 300, the history database 400 and the user setting database 500 in accordance with one embodiment of the present invention store comment information, history data and information for user settings concerning the display of comments, respectively. In general, these databases include a predetermined computer-readable recording medium. Examples of the computer-readable recording medium include, but are not limited to, hard disks, floppy disks, magnetic media such as magnetic tapes, optical recording media such as CD-ROMs and DVDs, magneto-optical media such as floptical disks, hardware units such as ROMs, RAMs, flash memories, etc. 'Databases' used herein are referred to as not only databases in a narrow meaning, but also databases in a broad meaning that include data records based on file systems. Also, even a simple log set can be labeled or involved as the database used in one embodiment of the present invention if one can retrieve and extract data from it. Further, a rating score database may be used separately as a database for storing rating scores of users, which may be based on the data in the history database 400.

Now, the blind function of the server 200 in accordance with one embodiment of the present invention will be explained in more detail. As noted earlier, the server 200 is connected physically or logically to one or more databases, such as, the comment database 300, the history database 400 and the user setting database 500, in accordance with one embodiment of the present invention.

In accordance with an embodiment of the present invention, upon receipt of a request from the user terminal unit 100 for transmitting a web page containing a particular comment, the server 200 provides an inquiry to the comment database 300 to extract comments that may be included on the web page. A program module of the server 200 performing such function may be named as a comment information extraction part (not shown). Once comments are extracted, all of them may be included in the web page requested by the user. Meanwhile, before sending the web page to the user terminal unit 100 through a content transmission part (not shown), the server 200 refers to the records in the history database 400 on all commenters, whose comments are to be included in the web page. Herein, a rating score for each commenter may be stored in the history database 400. Next, the server 200 refers to the user setting database 500. As explained earlier, stored in the user setting database 500 is information on the permit criteria for the display of comments set by the user, who requested the web page (i.e., information on the rating score as the permit criteria for the display of comments). By referring to the rating score of each commenter stored in the history database 400 and the information on the user-specific permit criteria for the display of comments stored in the user setting database 500, the server 200 may enable a comment display restriction part (not shown) to restrict comments that do not satisfy the display permit criteria from being shown on the web page. Such restriction may be implemented by substituting a comment display component constituting the web page with another kind of a guidance display component (e.g., a component showing a guidance phrase, "Display of any comment written by this user is blocked").

At least part of the aforementioned elements in the server 200 may be program modules to execute a specific function in the server 200 in accordance with one embodiment of the present invention. Such program modules may be included in the server 200 in the form of operating systems, application programs and other program modules, and may be saved physically on well-known memory units. Alternatively, such program modules may be saved in a remote memory unit that can communicate with the server 200. Examples of such program modules include, but are not limited to, routines, subroutines, programs, objects, components and data structures for executing a specific task to be described later in accordance with one embodiment of the present invention or a specific abstract data type.

Computation and Use of Rating Score

As noted above, the rating score (also called 'clean index' in Korea) is a value or a point given to a commenter, which can be added up or subtracted from, depending on whether comments by that commenter put a positive influence or a negative influence on others. In accordance with one embodiment of the present invention, the positive influence may be recognized from an activity that a user shows in the process of getting involved in posting comments irrelevant to triggering legal, moral or commercial problems in the Internet space, giving a lot of good feedbacks to other users, or getting good reactions from other users. On the other hand, the negative influence may be recognized from an activity that a user shows in the process of provoking other users to report on the user's malicious comments, or making an Internet portal site operator ban the user from posting comments.

The following is a detailed explanation as to how to compute a rating score in accordance with one embodiment of the present invention.

First, the rating score of a user may range between 0 and 200 points, with 100 as the initial points.

The rating score may be added up in the following situations. As an example, suppose that a user left 10 or more comments for one week with no misbehavior to lower his or her rating score being reported. In this case, 3 points, for example, can be added to his or her rating score after one week. In accordance with an embodiment of the present invention, the point addition may also be considered when other users recommend a comment by the user. In the latter case, the point addition can take place in real-time.

Meanwhile, the rating score may be lowered in the following situations. As an example, suppose that a particular user has received a punishment from an Internet portal site operator. Then, 10 points, for example, may be deducted from his or her rating score. Moreover, certain points may be deducted from the rating score of a user if other users reported the malice of his or her comment or expressed antipathy against his or her comment. In the latter case, the deducted points would be less than the deducted points based on the punishment. The point deduction can also be applied, in incorporation with the well-known spam filtering logic, to users who leave advertising comments. In this case, because of the frequent point deduction from the rating score, a user, who leaves advertising comments, may end up with losing the efficacy of inappropriate advertising act he or she originally intended.

Information on all kinds of user behaviors that result in point addition or point deduction to or from the rating score, as described above, can be stored in the history database 400 of the server 200 and be used for the computation of a rating score and the continuous management of user-specific comment history.

Figure 3:
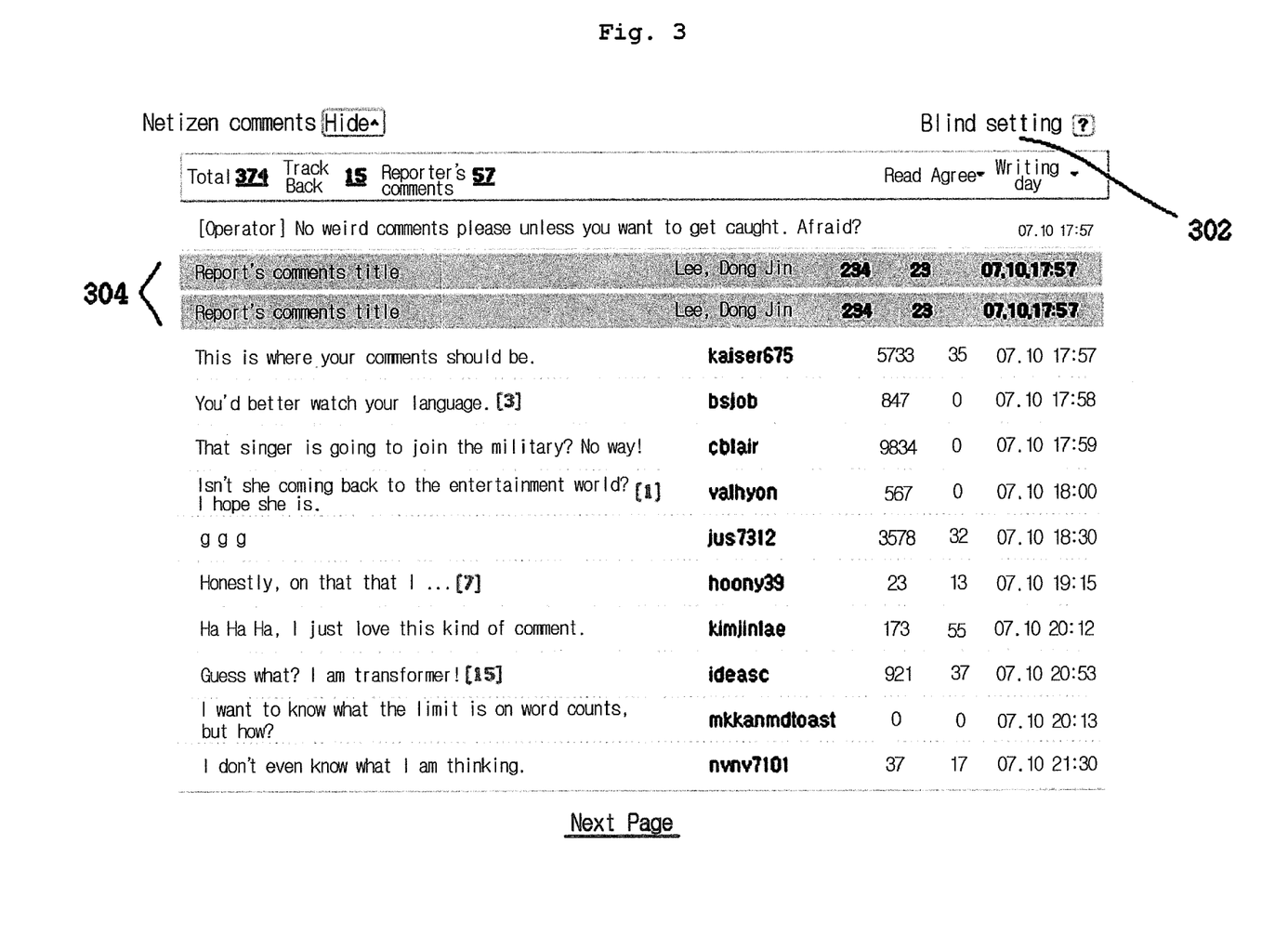
FIG. 3 presents an example of the display of comments in accordance with one embodiment of the present invention.

As discussed above, a rating score can be utilized most effectively in connection with the blind function. Referring to FIG. 3, there is a menu 302 called 'Blind setting' on the upper right side of the comment interface. A user may click the blind setting menu while viewing a web page with comments, and realizing that he or she has been exposed to too many unnecessary comments and rather missed some interesting comments. In this way, the user may increase the reference rating score he or she had set before in order to partially limit the display of comments from others. Further, as indicated by 304, more noticeable comments may be displayed on top of a list of the whole comments. Needless to say, a user may lower the reference rating score for the display of comments and further view interesting comments that could have been hidden otherwise.

User-Specific Management on the Display of Comments

In accordance with one embodiment of the present invention, use of a rating score is not limited to implementing the blind function.

Figure 4:
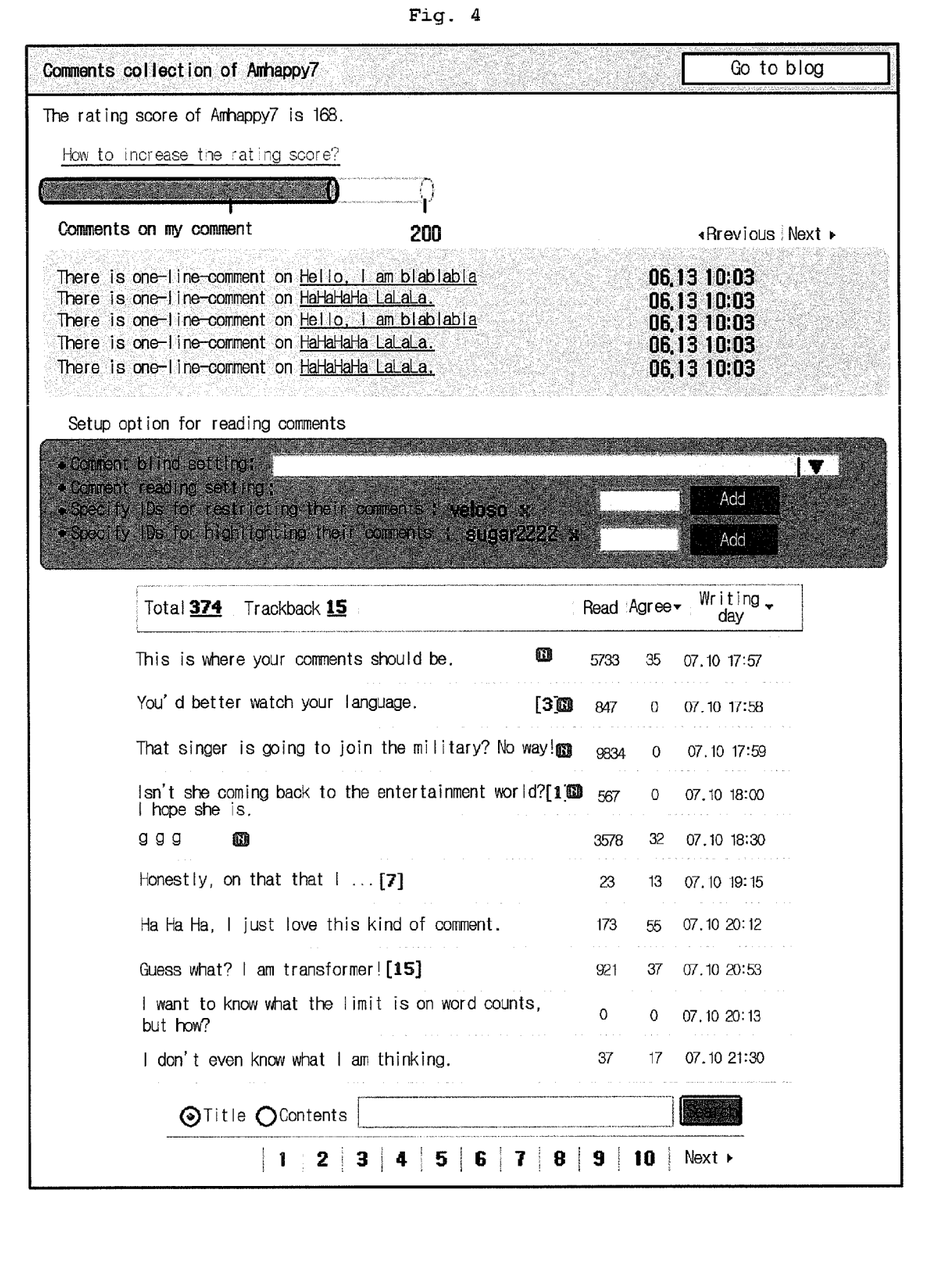
FIG. 4 offers an example of a user interface used for managing a comment display state of the user.

FIG. 4 shows one example of a user interface for the management of a user's own comment display state. Referring to FIG. 4, a user using 'Amhappy7' as his or her ID has a rating score of 168, and is provided with a list of comments posted in a chronological order. Through such a comment management interface, the user may easily spot an unwanted comment and delete them in person, or may easily view comments from other users, which are made in response to his or her comment.

According to the interface illustrated in FIG. 4, the user having 'Amhappy7' as his or her ID may change the reference rating score he or she had set for partially blocking the display of comments by other users, or may register/delete user IDs, the comments corresponding to which are set to be highlighted/blocked.

Figure 5:
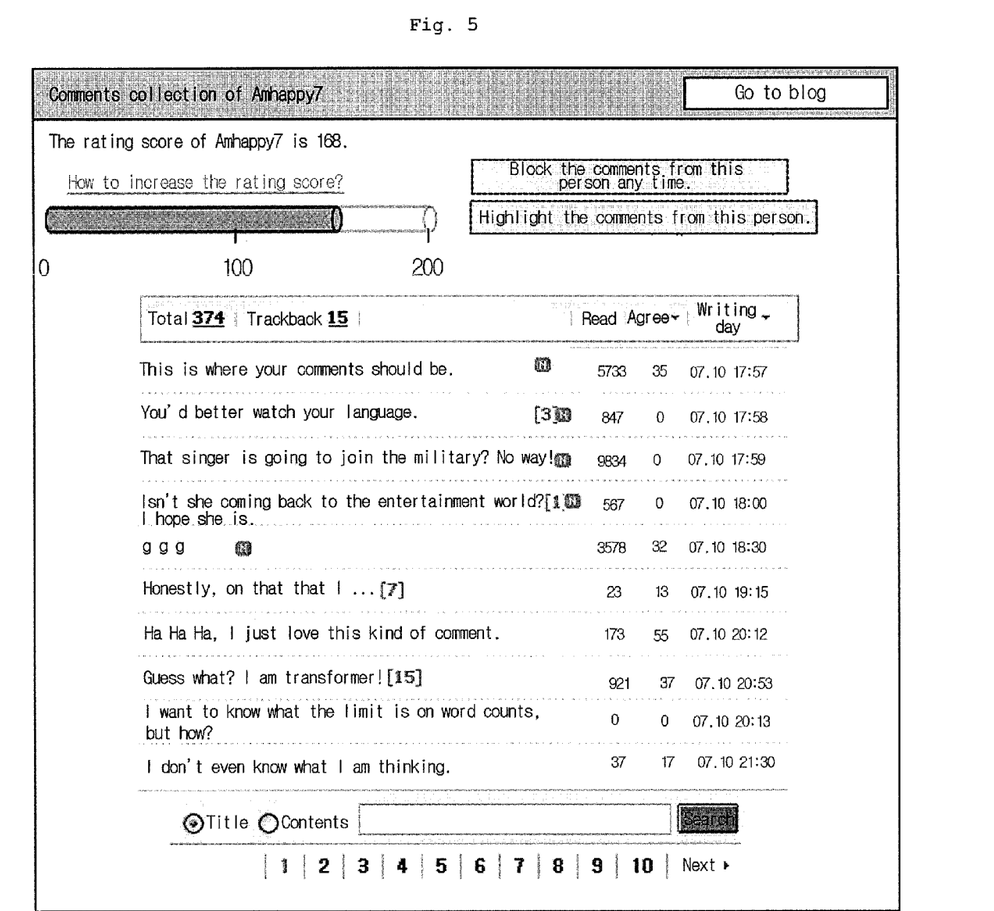
FIG. 5 depicts an example of a user interface used for managing a comment display state of another user.

FIG. 5 presents one example of a user interface for the management of a comment display state of other user. Referring to the interface of FIG. 5, a certain user checks the rating score of the user having 'Amhappy7' as his or her ID and views a list of comments by the same user. Moreover, he or she may be provided with a button that can be used to block the comments by the user having 'Amhappy7' as his or her ID at any time, or highlight the comments by the same user. In this way, the interface helps him or her easily control the display state of the comments by the user having 'Amhappy7' as his or her ID.

In accordance with one embodiment of the present invention, a user can selectively view comments with good intentions he or she can accept, based on rating scores or other information set by him or her.

In addition, in accordance with one embodiment of the present invention, the number of malicious comments can be noticeably reduced by leading people to be discouraged from posting malicious comments.

Moreover, in accordance with one embodiment of the present invention, a user can selectively view other users' comments depending on his or her tastes or judgments.

While embodiments of the invention has been shown and described, it will be understood by those skilled in the art that various changes and modifications may be made without departing from the spirit and the scope of the invention as defined in the following claims.

What is claimed is:

1. A method of selectively displaying comments posted by users, comprising:
    setting a threshold value for use in determining whether to display comments posted by users of an Internet service;
    receiving a request from a first user for displaying a page of the Internet service, the requested page comprising a comment or a title of a comment posted by a second user, wherein the second user has a reputation index based on the second user's previous comments; and
    displaying, on a screen associated with the first user, the requested page, wherein the comment or the title of the second user is selectively redacted based on comparison of the reputation index of the second user with the threshold value,
    wherein the reputation index is configured to be upgraded based on at least one of a number of comments that the second user posted and a number of recommendations for the second user's comments received from other users, and is configured to be degraded based on at least one of a number of penalties on the second user received from an operator of the Internet service and a number of advertising comments that the second user posted.

2. The method of claim 1, wherein the comment or the title of the second user is censored when the threshold value is greater than the reputation index, whereas the comment or the title of the second user is displayed when the threshold value is smaller than the reputation index.

3. The method of claim 1, wherein the comment or the title of the second user is censored when the threshold value is smaller than the reputation index, whereas the comment or the title of the second user is displayed when the threshold value is greater than the reputation index.

4. The method of claim 1, further comprising:
    receiving a request from the first user to unredact a redacted portion of the page; and
    displaying the page containing the initially redacted portion as unredacted.

5. The method of claim 1, wherein the comment is an opinion or information made by the second user regarding at least one selected from the group consisting of a news article, a commentary, a review, and information on a product or service.

6. A method of selectively displaying comments posted by users, comprising:
    receiving, from a first user, a request for displaying a page;
    determining that the requested page comprises a comment posted by a second user or a title of the comment;
    determining that the second user has a reputation index, which is indicative of a reputation based on previous comments posted by the second user; and
    determining whether to display the comment or the title on the page using the reputation index,
    wherein the reputation index is configured to be upgraded based on at least one of a number of comments that the second user posted and a number of recommendations for the second user's comments received from other users, and is configured to be degraded based on at least one of a number of penalties on the second user received from an operator of the Internet service and a number of advertising comments that the second user posted.

7. The method of claim 6, further comprising:
    receiving, from the first user, a request for setting a threshold value for use in determining whether to display comments or titles of comments posted by other users of the Internet service; and
    setting the threshold value for the first user in reply to the request therefor.

8. The method of claim 7, wherein the determining whether to display the comment or the tile comprises comparing the threshold value with the reputation index.

9. The method of claim 6, further comprising:
    sending data to display the requested page to a terminal associated with the first user,
    wherein when it is determined not to display the comment or the title, the comment or the title is redacted on the requested page.

10. The method of claim 9, wherein the comment or the title of the second user is censored when the threshold value is greater than the reputation index, whereas the comment or the title of the second user is displayed when the threshold value is smaller than the reputation index.

11. The method of claim 9, wherein the comment or the title of the second user is censored when the threshold value is smaller than the reputation index, whereas the comment or the title of the second user is displayed when the threshold value is greater than the reputation index.

12. The method of claim 6, wherein the comment is an opinion or information made by the second user regarding at least one selected from the group consisting of a news article, a commentary, a review, and information on a product or service.

13. A method of operating an Internet service allowing its users to post comments, comprising:
   posting a plurality of comments made by a first user of an Internet service;
   receiving a plurality of inputs of users on at least part of the plurality of comments of the first user; and
   processing the plurality of inputs so as to assign the first user a reputation index to be used in determining whether to include a comment of the first user or a title of the comment on a page of the Internet service, wherein the reputation index is indicative of a reputation based on previous comments posted by the first user,
   wherein the reputation index is configured to be upgraded based on at least one of a number of further comments that the first user posted and a number of recommendations for the first user's comments received from other users, and is configured to be degraded based on at least one of a number of penalties on the first user received from an operator of the Internet service and a number of advertising comments that the first user posted.

14. The method of claim 13, the comment is an opinion or information made by the first user regarding at least one selected from the group consisting of a news article, a commentary, a review, and information on a product or service.

15. The method of claim 13, wherein the plurality of inputs comprise at least one selected from the group consisting of a score, a rating, and a selection among two or more levels of approval or agreement with the comment.

16. The method of claim 13, wherein the reputation index is generated using other information relating to comments of the first user in addition to the plurality of inputs of users of the Internet service.

17. The method of claim 13, further comprising:
   receiving additional inputs of users on at least part of the plurality of comments of the first user; and
   further processing the additional inputs so as to modify the reputation index of the first user.

18. The method of claim 13, further comprising:
   receiving, from a second user, a request for displaying a page;
   determining that the requested page comprises the comment posted by the first user or the title of the comment; and
   determining whether to display the comment or the title on the page using the reputation index.

19. The method of claim 18, further comprising:
   sending data to display the requested page to a terminal associated with the first user,
   wherein when it is determined not to display the comment or the title, the comment or the title is redacted on the requested page.

20. The method of claim 18, further comprising:
   setting a threshold value for use in determining whether to display comments or titles of comments posted by other users of the Internet service; and
   wherein the determining whether to display comprises comparing the threshold value with the reputation index.

* * * * *